United States Patent
Hsu et al.

(10) Patent No.: US 7,851,735 B2
(45) Date of Patent: Dec. 14, 2010

(54) MICROSCOPE AUTOMATIC FOCUSING DEVICE AND METHOD THEREOF

(75) Inventors: Wei-Yao Hsu, Hsinchu (TW); Chien-Shing Lee, Hsinchu (TW); Nien-Tsu Chen, Hsinchu (TW); Po-Jui Chen, Hsinchu (TW); Cheng-Fang Ho, Hsinchu (TW); Fang-Hsuan Su, Hsinchu (TW); Fong-Zhi Chen, Hsinchu (TW); Chien-Jen Chen, Hsinchu (TW)

(73) Assignee: Technology Research Center National Applied Research Laboratories, Hsinchu (TW)

( * ) Notice: Subject to any disclaimer, the term of this patent is extended or adjusted under 35 U.S.C. 154(b) by 68 days.

(21) Appl. No.: 11/863,783

(22) Filed: Sep. 28, 2007

(65) Prior Publication Data
US 2008/0135724 A1 Jun. 12, 2008

(30) Foreign Application Priority Data
Dec. 12, 2006 (TW) ............................... 95146543 A

(51) Int. Cl.
*G02B 7/04* (2006.01)
*G06M 7/00* (2006.01)
(52) U.S. Cl. .................................... 250/201.3; 250/221
(58) Field of Classification Search .................. 250/221, 250/201.2–201.8; 359/383; 396/72, 77, 396/79, 80, 82
See application file for complete search history.

(56) References Cited

U.S. PATENT DOCUMENTS

| 4,503,324 A * | 3/1985 | Yokota .................... 250/201.5 |
| 4,931,630 A * | 6/1990 | Cohen et al. ............. 250/201.3 |
| 5,247,165 A * | 9/1993 | Hiruta et al. ............. 250/201.3 |
| 6,229,771 B1 * | 5/2001 | Kosoburd et al. ........ 369/44.23 |
| 7,345,814 B2 * | 3/2008 | Yoneyama et al. .......... 359/383 |
| 2005/0128896 A1 * | 6/2005 | Katayama ................ 369/44.23 |

FOREIGN PATENT DOCUMENTS

| JP | 64055513 A | 3/1989 |
| JP | 04158320 A | 6/1992 |
| JP | 2000294608 A | 10/2000 |
| TW | 554177 | 9/2003 |
| TW | I226454 | 1/2005 |

* cited by examiner

*Primary Examiner*—Thanh X Luu
*Assistant Examiner*—Pascal M Bui-Pho
(74) *Attorney, Agent, or Firm*—Volpe and Koenig, P.C.

(57) ABSTRACT

An auto focus device and method are provided. The device comprises a beam splitter set; a laser emitting device disposed at a first side of the beam splitter set for providing a laser beam to the beam splitter; a lens set disposed at a second side of the beam splitter set and opposing to the testing subject positioned at a third side of the beam splitter set for refracting a reflected beam from a testing subject for generating a light spot; and a photo detecting device disposed with respect to the lens set for receiving the light spot and generating a driving signal.

11 Claims, 3 Drawing Sheets

MICROSCOPE AUTOMATIC FOCUSING DEVICE AND METHOD THEREOF

FIELD OF THE INVENTION

The present invention relates to an automatic focusing device, and more particular to an automatic focusing device for the microscope system.

BACKGROUND OF THE INVENTION

On the basis of the optic principle, it is clear that no matter where the light out of the convex axis comes from, after it passes through the convex, it will be refracted to a point called focus. Usually, the plane composed by all the points located on the positions which can form the clear images is called the focal plane. The objects on the focal plane can form the clear images, and the objects located out of the focal plane form the blurry images.

The general optical inspection instrument, such as the microscope, uses the manual focus method to adjust the distance between the lens and the object or between the lens and the eyes of the observer so as to form the clear image. Observing and manually adjusting together often slows the user's action and results in mistakes easily. However, the critical observations are usually time dependent, which are often missed because of the inaccurate and slow manual adjustment. Therefore, the automatic focusing technique is provided for solving the defects of the manual adjustment.

The distance detecting method is used commonly in the traditional automatic focusing technique which detects the object distance and calculates the image distance corresponding thereto to adjust the system to make it in the accurate focus state. Since the developments of the calculation and the digital image processing theory are maturing, the automatic focusing technique enters a new digital era. There are more and more automatic focusing methods analyzing and calculating the image information based on the image processing theory, and driving the electric motor according to the analyzed and calculated data to adjust the optic system to the precise focus.

Nowadays, the known automatic focusing methods include the steps of the data acquisition and data process, the optimal searching algorithm, the stepping electric motor driving and the zoom tracing, etc. The image data are collected step by step and compared to the preceding one, and the image will be from blurry to clear and become blurred again, so that the search method is like mountain climbing. Using such automatic focusing method, the focus has to be passed by and be re-found by the reverse locating. This iterative computation needs complex calculating processes and thus raises the cost of the hardware thereof. The mountain climbing searching method also delays the time for focusing.

In order to overcome the drawbacks in the prior art, an improved automatic focusing device and method are provided. The particular design in the present invention not only solves the problems described above, but also is easy to be implemented. Thus, the present invention has the utility for the industry.

SUMMARY OF THE INVENTION

The major aspect of the present invention is to provide an automatic focusing device with faster adjustment than the conservative one.

According to foregoing conception, the present invention provides an automatic focusing device for adjusting a relative distance between an objective and a testing subject, comprising a beam splitter set; a laser emitting device disposed at a first side of the beam splitter set for providing a laser beam to the beam splitter; a lens set disposed at a second side of the beam splitter set and opposing to the testing subject positioned at a third side of the beam splitter set for refracting a reflected beam from a testing subject for generating a light spot; and a photo detecting device disposed with respect to the lens set for receiving the light spot and generating a driving signal.

Preferably, the automatic focusing device further includes a driving device electrically connected to the photo detecting device for receiving the driving signal.

In accordance with the automatic focusing device described above, the lens set is one of a cylindrical lens set and a spherical lens set.

In accordance with the automatic focusing device described above, the photo detecting device is a quadrant photo detecting device.

In accordance with the automatic focusing device described above, the driving device adjusts the relative distance by driving one of the objective and the testing subject.

In accordance with the automatic focusing device described above, the light spot generates an astigmatism shape according to the relative distance; the photo detecting device comprises a database storing the data of a specific focus error signal (FES) and a defocus distance value corresponding thereto; and a comparing device calculating a corresponding FES according to the astigmatism shape and obtaining a corresponding defocus distance value by comparing the FES to the database, and the driving signal is generated according to the corresponding defocus distance value.

According to foregoing conception, the present invention provides a microscope automatic focusing system (MAF), comprising an automatic focusing device for adjusting a corresponding distance between an objective and a testing subject, the automatic focusing device comprising a beam splitter set altering a light pathway; a laser emitting device disposed at a first side of the beam splitter set, and providing a laser beam; a lens set disposed at a second side of the beam splitter set and opposing to a testing subject at a third side of the beam splitter set for refracting a reflected beam from the testing subject for generating a light spot; a photo detecting device disposed at the second side of the beam splitter set for receiving the light spot and generating a driving signal; and a driving device electrically connected to the photo detecting device for receiving the driving signal.

In accordance with the MAF described above, the lens set is one of a cylindrical lens set, a spherical lens set and one of a biconic lens set.

In accordance with the MAF described above, the photo detecting device is a quadrant photo detecting device.

In accordance with the MAF described above, the driving device adjusts the relative distance by driving one of the objective and the testing subject.

In accordance with the MAF described above, the light spot generates an astigmatism shape according to the corresponding distance; the photo detecting device comprises a database storing a data of a focus error signal (FES) and a defocus distance value corresponding thereto; and a comparing device calculating a corresponding FES according to the astigmatism shape and obtaining a corresponding defocus distance value by comparing the FES to the database, and the driving signal is generated according to the corresponding defocus distance value.

According to another conception, the present invention provides an automatic focusing method for adjusting a focal distance of an objective, comprising the steps of providing a laser beam to a testing subject; refracting a reflected beam from a testing subject for generating a light spot; analyzing the light spot; and generating a driving signal for adjusting the focal distance.

In accordance with the automatic focusing method described above, one of a cylindrical lens set, a spherical lens set and a biconic lens set is used to refract the reflected beam.

In accordance with the automatic focusing method described above, the reflected beam is refracted by a lens set.

In accordance with the automatic focusing method described above, the spot generates an astigmatism image according to a relative distance between the objective and the testing subject.

Preferably, the automatic focusing method further includes a step of obtaining a focus error signal by analyzing the astigmatism image Preferably, the automatic focusing method further includes a step of obtaining a focus error value by comparing the focus error signal with a predetermined table for the focus error signal to the focus error value.

In accordance with the automatic focusing method described above, the driving signal is generated according to the focus error value.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
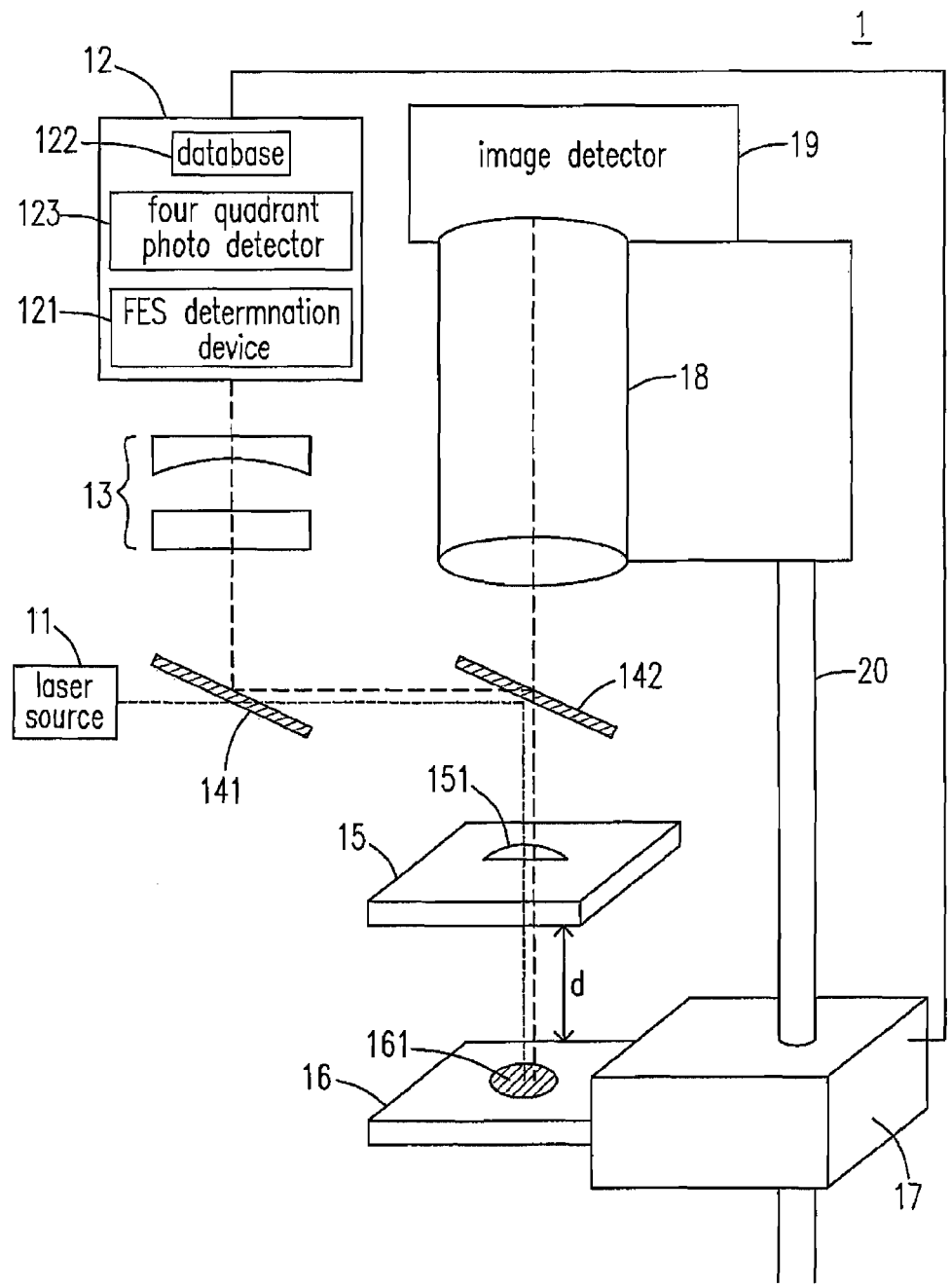
FIG. 1 is a diagram showing the automatic focusing device according to a preferred embodiment of the present invention.

Please refer to FIG. 1, which is a diagram showing the automatic focus device according to a preferred embodiment of the present invention. The usage of the general microscope automatic focus system (MAF) is that the subject 161 is put on the stage 16 and the subject image will be traced through the objective 151 and the eyepiece 18. Then, the subject image is presented on the image detector 19 to be observed and recorded. The different objectives 151 have different magnifications and focal length, so relative distances (d) between the objective 151 and the subject 161 are not always fixed the focus length. The conventional method is performed by manually adjusting the distance (d) between the objective 151 and the subject 161 until the subject 161 is right on the focus so as to form the clearest image.

The automatic focusing device 1 of the present invention is disposed on the common MAF, which uses a laser source 11 to emit a laser beam that is reflected by a beam splitter set 142 to project on a subject 161. The subject 161 reflects the laser beam. The reflected laser beam is refracted by the objective 151 and transferred to a cylindrical lens set 13 or a biconic lens set (not shown) through the beam splitter sets 141, 142. The reflected laser beam is refracted again by the cylindrical lens set 13 or the biconic lens set (not shown) to form an image on a quadrant photo detector 123. When the relative distance (d) between the objective 151 and the subject 161 is not equal to the focal distance of the objective 151, the spot shape of the image formed on the quadrant photo detector 123, which is formed by the laser beam reflected by the subject 161 and refracted by the cylindrical lens set 13 or the biconic lens set (not shown), will change correspondingly that is called an astigmatism. A spherical lens set 13 can be included in the cylindrical lens set 13 for correcting the optical aberration to have better optical performance. The signal processing unit 12 has a comparing device 121, which calculates the spot shape deformation with the astigmatism to generate the Focus Error Signal (FES). The signal processing unit 12 also has a database 122, which determines the relative distance (d) corresponding to the FES with an unfocused distance of the focal distance. The signal processing unit 12 generates a driving signal on the basis of the defocus distance to drive a driving motor 17 configured on the subject seat 16 to move the subject seat 16 along the fixing axle 20 for adjusting the relative distance (d) between the objective 151 and the subject 161. The driving motor 17 can also be configured on the objective seat 15 to move the objective seat 15 along the fixed axle 20 for adjusting the relative distance (d) between the objective 151 and the subject 161. When the relative distance (d) is equal to the focal distance of the objective 151, the clear image of the subject 161 is presented on the image detector 19 through the objective 151 and the eyepieces 18 for observation and recording.

Figure 2:
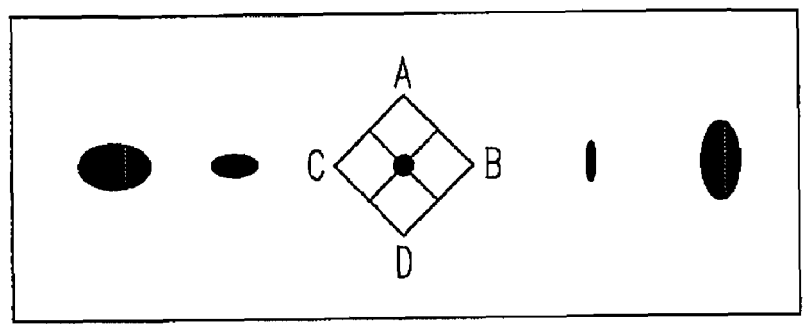
FIG. 2 illustrates the astigmatism image of the light spot and the focus error value corresponding thereto in the present invention.

The astigmatism spot shape will change according to the difference between the focal distance and the relative distance (d) between the objective 151 and the subject 161. When the relative distance (d) is smaller than the focal distance, it is called near focus. When the relative distance (d) is larger than the focal distance, it is called far focus. When the relative distance (d) is equal to the focal distance, it is called focus. Please refer to FIG. 2, which illustrates the astigmatism shape of the light spot and the focus error value corresponding thereto in the present invention. Because the different astigmatism shape deformation have different quadrant ratios, the focus error signal can be calculated by the formula below:

$$FES = \frac{(VA + VC) - (VB + VD)}{(VA + VC + VB + VD)}$$

Figure 3:
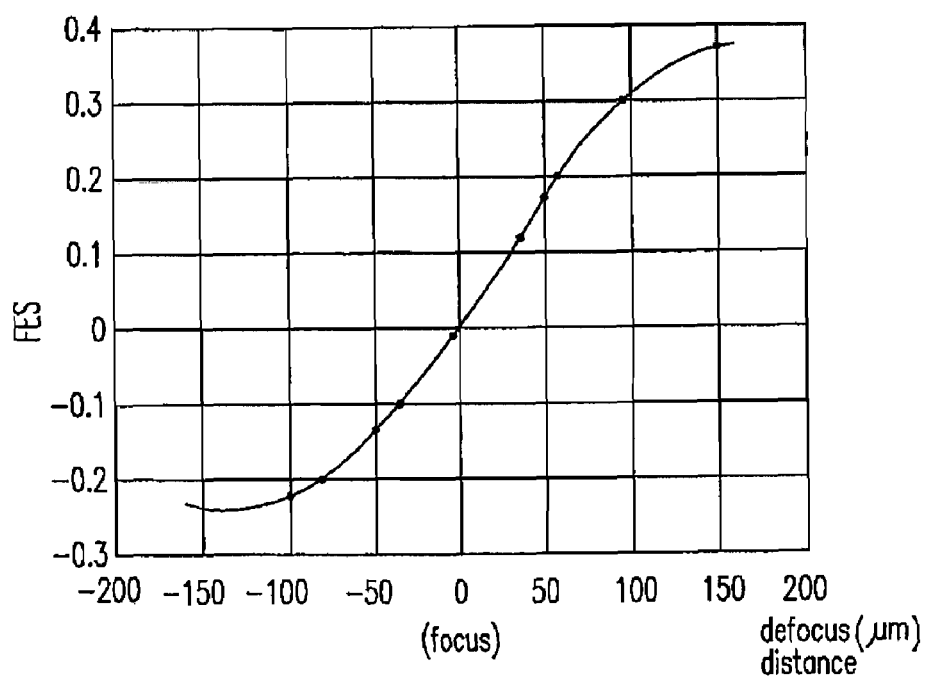
FIG. 3 is a curve diagram showing the relationship between the focus error signal (FES) and the unfocused distance corresponding thereto in the present invention.

Please refer to FIG. 3, which is a curve diagram showing the relationship between the focus error signal (FES) and the defocus distance corresponding thereto in the present invention. The comparing device 121 of the four quadrant photo detector 12 can find out a defocus distance corresponding to an FES by using FIG. 3 and generate a driving signal according to the defocus distance to drive a driving motor 17.

Figure 4:
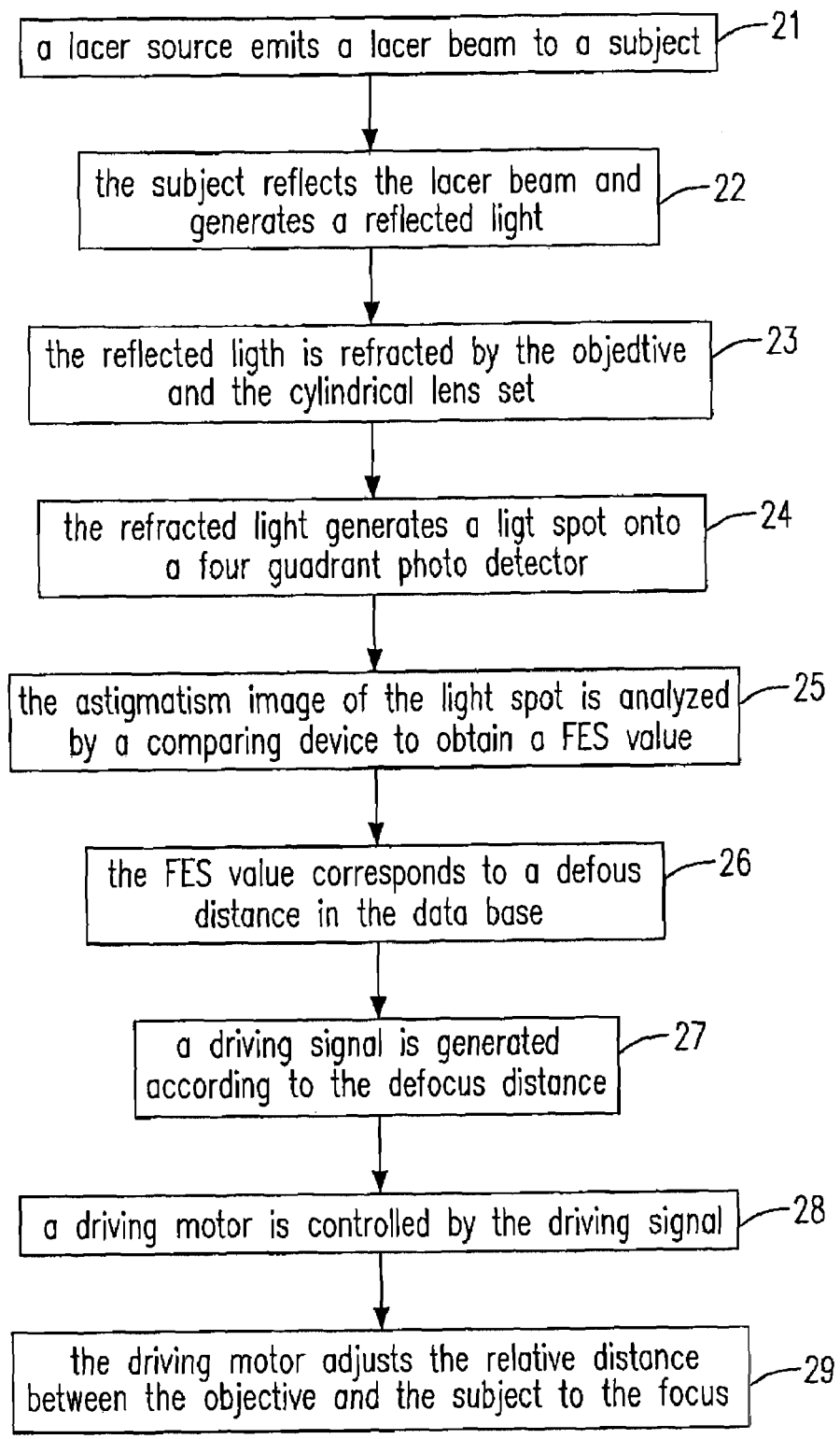
FIG. 4 is a flow chart of the automatic focusing method in the present invention.

Please refer to FIG. 4, which is a flow chart of the automatic focusing method in the present invention. The steps of the automatic focusing method are described below: a laser source emits a laser beam onto a subject (step 21); the object reflects the laser beam and generates a reflected light (step 22); the reflected light is refracted by the objective and the cylindrical lens set or the biconic lens set (step 23); the refracted light generates a light spot on a four quadrant photo detector (step 24); the astigmatism shape of the light spot is analyzed by a comparing device to obtain an FES value (step 25); the FES value corresponds to a defocus value in the database (step 26); a driving signal is generated according to the defocus value (step 27); a driving motor is controlled by the driving signal (step 28); and the driving motor adjusts the relative distance between the objective and the subject to the focus position (step 29).

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A microscope having an automatic focusing device for adjusting a relative distance between a microscopic objective and a testing subject due to a different focus length therebetween, comprising:
   a beam splitter set having a beam splitter;
   a laser emitting device disposed at a first side of the beam splitter set for providing a laser beam to the beam splitter set;
   an image detector;
   an eye piece;
   the microscopic objective disposed between the beam splitter of the beam splitter set and the testing subject, allowing an image of the testing subject to pass through and enter the image detector via the eye piece, focusing the laser beam from the beam splitter onto the testing subject, and allowing a reflected beam from the testing subject to pass through and enter the beam splitter set;
   a lens set disposed at a second side of the beam splitter set and opposing to the testing subject positioned at a third side of the beam splitter set for refracting the reflected beam from the testing subject for generating a light spot; and
   a photo detecting device disposed with respect to the lens set for receiving the light spot and generating a driving signal, wherein the photo detecting device determines a defocus distance ranging from 10 to 100 micrometers based upon an astigmatism shape of the light spot, and generates the driving signal based upon the defocus distance.

2. The microscope having an automatic focusing device according to claim 1, further comprising a driving device electrically connected to the photo detecting device for receiving the driving signal.

3. The microscope having an automatic focusing device according to claim 1, wherein the lens set is one of a cylindrical lens set, a spherical lens set and a biconic lens set.

4. The microscope having an automatic focusing device according to claim 1, wherein the photo detecting device is a quadrant photo detecting device.

5. The microscope having an automatic focusing device according to claim 4, wherein the driving device adjusts the relative distance by driving one of the objective and the testing subject.

6. The microscope having an automatic focusing device according to claim 1, wherein:
   the light spot generates the astigmatism shape according to the relative distance;
   the photo detecting device comprises: a database storing a data of a focus error signal (FES) and a defocus distance value corresponding thereto; and a comparing device calculating a corresponding FES according to the astigmatism shape and obtaining the corresponding defocus distance value by comparing the FES to the database.

7. A microscope automatic focusing system (MAF), comprising:
   an automatic focusing device for adjusting a focal distance between a microscopic objective and a testing subject, the automatic focusing device comprising:
   a first beam splitter altering a light pathway;
   a laser emitting device disposed at a first side of the first beam splitter, and providing a laser beam;
   a second beam splitter disposed at a second side of the first beam splitter, altering the laser beam via the microscopic objective to the testing subject, altering a reflected beam from the testing subject to the first beam splitter, and allowing a subject image from the testing subject via the objective to pass;
   an image detector observing and recording the subject image;
   a lens set disposed at a third side of the first beam splitter for refracting the reflected beam from the testing subject via the first beam splitter for generating a light spot; and
   a photo detecting device disposed at the third side of the first beam splitter for receiving the light spot, determining a defocus distance ranging from 10 to 100 micrometer based upon the light spot, and generating a driving signal; and
   a driving device electrically connected to the photo detecting device for receiving the driving signal, wherein the microscopic objective allows an image of the testing subject to pass through and enter the image detector via the eye piece, focuses the laser beam from the second beam splitter onto the testing subject, and allows the reflected beam from the testing subject to pass through and enter the first and second beam splitters.

8. A MAF according to claim 7, wherein the lens set is one of a cylindrical lens set, a spherical lens set and a biconic lens set.

9. A MAF according to claim 7, wherein the photo detecting device is a quadrant photo detecting device.

10. A MAF according to claim 9, wherein the driving device adjusts the focal distance by driving one of the objective and the testing subject.

11. A MAF according to claim 7, wherein:
   the light spot generates an astigmatism shape according to the focal distance;
   the photo detecting device comprises: a database storing a data of a focus error signal (FES) and a defocus distance value corresponding thereto; and a comparing device calculating a corresponding FES according to the astigmatism shape and obtaining the corresponding defocus distance value by comparing the FES to the database, and the driving signal is generated according to the corresponding defocus distance value.

* * * * *